US011086096B2

(12) United States Patent
Torii

(10) Patent No.: US 11,086,096 B2
(45) Date of Patent: Aug. 10, 2021

(54) LENS APPARATUS AND IMAGING APPARATUS HAVING THE SAME

(71) Applicant: CANON KABUSHIKI KAISHA, Tokyo (JP)

(72) Inventor: Shigehiro Torii, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 16/445,540

(22) Filed: Jun. 19, 2019

(65) Prior Publication Data

US 2019/0391359 A1  Dec. 26, 2019

(30) Foreign Application Priority Data

Jun. 22, 2018  (JP) .............................. JP2018-118475

(51) Int. Cl.
*G02B 7/02* (2021.01)
(52) U.S. Cl.
CPC .................................. *G02B 7/026* (2013.01)
(58) Field of Classification Search
CPC . G02B 7/026; G02B 7/02; G02B 7/00; G02B 7/04
USPC ........................................................ 359/819
See application file for complete search history.

(56) References Cited

U.S. PATENT DOCUMENTS

| 6,721,111 | B2* | 4/2004 | Nomura | G02B 7/021 |
| | | | | 353/100 |
| 6,751,032 | B2* | 6/2004 | Nomura | G02B 7/102 |
| | | | | 359/693 |
| 7,016,121 | B2* | 3/2006 | Kawanabe | G02B 7/023 |
| | | | | 359/694 |
| 7,852,578 | B2* | 12/2010 | Iwasaki | G02B 7/102 |
| | | | | 359/819 |
| 8,064,150 | B2* | 11/2011 | Nakada | G02B 7/102 |
| | | | | 359/819 |
| 2002/0135896 | A1* | 9/2002 | Nomura | G02B 7/021 |
| | | | | 359/819 |

(Continued)

FOREIGN PATENT DOCUMENTS

| JP | H11119079 A | 4/1999 |
| JP | 2013003452 A | 1/2013 |
| JP | 6146960 B2 | 6/2017 |

*Primary Examiner* — William R Alexander
(74) *Attorney, Agent, or Firm* — Carter, DeLuca & Farrell LLP

(57) ABSTRACT

A lens apparatus includes a first cam follower engaged with a cam groove and a first rectilinear groove, and configured to move forward and backward in an optical axis direction of the lens apparatus with rotation of the cam barrel, a second movable member including a second cam follower engaged with the cam groove and a second rectilinear groove, and configured to move forward and backward in the optical axis direction with rotation of the cam barrel, a contacting member provided on the first movable member, and a biasing member configured to bias the contacting member. The contacting member includes a first contacting portion that contacts the second movable member, the second movable member includes a second contacting portion that contacts the first contacting portion, and at least one of the first contacting portion and the second contacting portion inclines to the optical axis direction.

10 Claims, 7 Drawing Sheets

(56) References Cited

U.S. PATENT DOCUMENTS

| | | | |
|---|---|---|---|
| 2003/0081328 A1* | 5/2003 | Nomura | G02B 7/102 |
| | | | 359/700 |
| 2005/0105193 A1* | 5/2005 | Kawanabe | G02B 7/023 |
| | | | 359/694 |
| 2010/0020412 A1* | 1/2010 | Iwasaki | G02B 7/102 |
| | | | 359/699 |
| 2010/0302658 A1* | 12/2010 | Watanabe | B29C 70/682 |
| | | | 359/826 |
| 2015/0192756 A1* | 7/2015 | Uno | G02B 7/10 |
| | | | 359/696 |
| 2016/0124179 A1* | 5/2016 | Asayama | G02B 7/04 |
| | | | 359/700 |
| 2017/0219794 A1* | 8/2017 | Uno | H04N 5/238 |

* cited by examiner

LENS APPARATUS AND IMAGING APPARATUS HAVING THE SAME

BACKGROUND OF THE INVENTION

Field of the Invention

The present invention relates generally to a lens apparatus configured to move back and forth along an optical axis, a lens holding barrel that holds a lens as a cam ring rotates, and more particularly to a lens apparatus configured to prevent the lens holding barrel from rattling in an operation or orientation change.

Description of the Related Art

In one conventionally known lens barrel, as a cam ring rotates, a lens holding barrel that holds a lens moves back and forth along an optical axis via a cam follower provided onto the lens holding barrel and engaged with a cam groove formed in the cam ring and a rectilinear groove formed in a guiding barrel. Any rattling between the cam and rectilinear grooves and the cam follower may degrade the optical performance. More specifically, any rattling between the cam groove and the cam follower may cause the lens position accuracy and tilt to change in the operation, and any rattling between the rectilinear groove and the cam follower may cause the lens tilt to change as the orientation changes.

Japanese Patent No. ("JP") 6146960 discloses a lens barrel including a support member that has a cam follower engaged with a cam groove and a rectilinear groove and is disposed apart from a lens holding barrel by a predetermined distance in the optical axis direction, and a biasing member provided between the lens holding barrel and the support member. In the lens barrel disclosed in JP 6146960, the lens holding barrel and the support member are separated from or attracted to each other, the cam follower of the lens holding barrel and the cam follower of the support member are forced against the cam groove and the rectilinear groove by the component force of the biasing force of the biasing member. Thus, the degradation of the optical performance can be suppressed by eliminating the rattling between the cam and rectilinear grooves and the cam follower.

When the lens holding barrel is heavy, it is necessary to reduce the operating torque of the lens holding barrel by reducing the cam elevation angle of the cam groove. In the lens barrel disclosed in JP 6146960, the receiving surface on the lens holding barrel side and the receiving surface on the support member side, which receive the end face of the biasing member, are both orthogonal to the optical axis. Assume that F is a biasing force of the biasing member in the optical axis direction, and $\theta$ is a cam elevation angle. Then, a biasing force in the direction orthogonal to the rectilinear groove is expressed by $F \sin \theta \cos \theta$ and a biasing force in the direction orthogonal to the cam groove is expressed by $F \cos \theta$. In other words, as the cam elevation angle is smaller, the biasing force $F \sin \theta \cos \theta$ in the direction orthogonal to the rectilinear groove is smaller. Thus, as the orientation changes, the rattling between the rectilinear groove and the cam follower cannot be completely removed, and the optical performance may be degraded.

SUMMARY OF THE INVENTION

The present invention provides a lens apparatus that can suppress a degraded optical performance as an orientation changes, and an imaging device including the same.

A lens apparatus according to one aspect of the present invention includes a cam barrel including a cam groove, a guiding barrel including a first rectilinear groove and a second rectilinear groove, a first movable member including a first cam follower engaged with the cam groove and the first rectilinear groove, and configured to move forward and backward in an optical axis direction of the lens apparatus with rotation of the cam barrel, a second movable member including a second cam follower engaged with the cam groove and the second rectilinear groove, and configured to move forward and backward in the optical axis direction with rotation of the cam barrel, a contacting member provided on the first movable member, and a biasing member configured to bias the contacting member. The contacting member includes a first contacting portion that contacts the second movable member, the second movable member includes a second contacting portion that contacts the first contacting portion, and at least one of the first contacting portion and the second contacting portion inclines to the optical axis direction.

An imaging apparatus according to another aspect of the present invention includes the above lens apparatus, and a camera body configured to hold an image sensor configured to photoelectrically convert an optical image formed through the lens apparatus.

Further features of the present invention will become apparent from the following description of exemplary embodiments with reference to the attached drawings.

DESCRIPTION OF THE EMBODIMENTS

Figure 1:
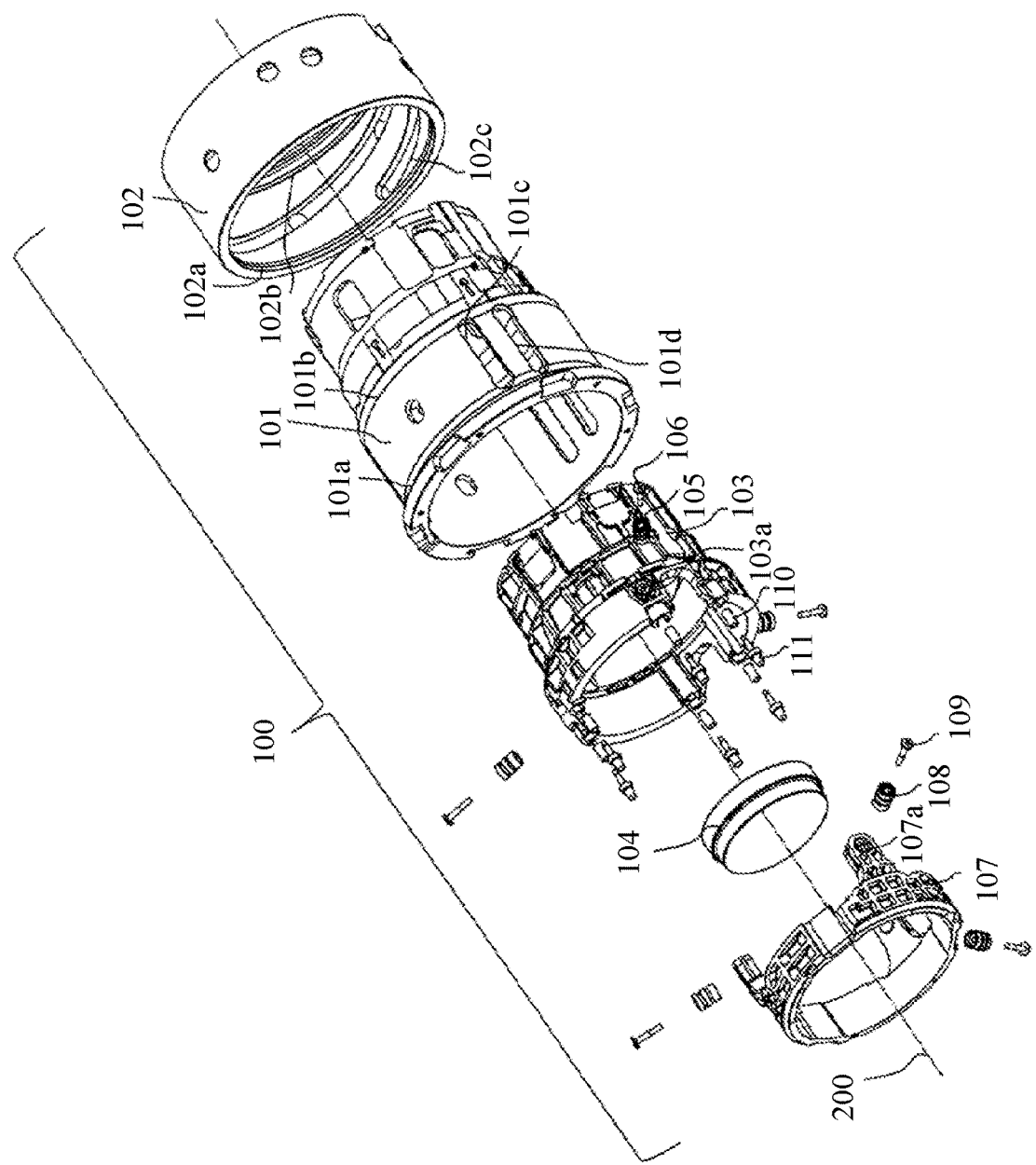
FIG. 1 is an exploded perspective view of a lens barrel according to a first embodiment.

Referring now to the accompanying drawings, a description will be given of embodiments according to the present invention. Corresponding elements in respective figures will be designated by the same reference numerals, and a duplicate description thereof will be omitted.

First Embodiment

Figure 2:
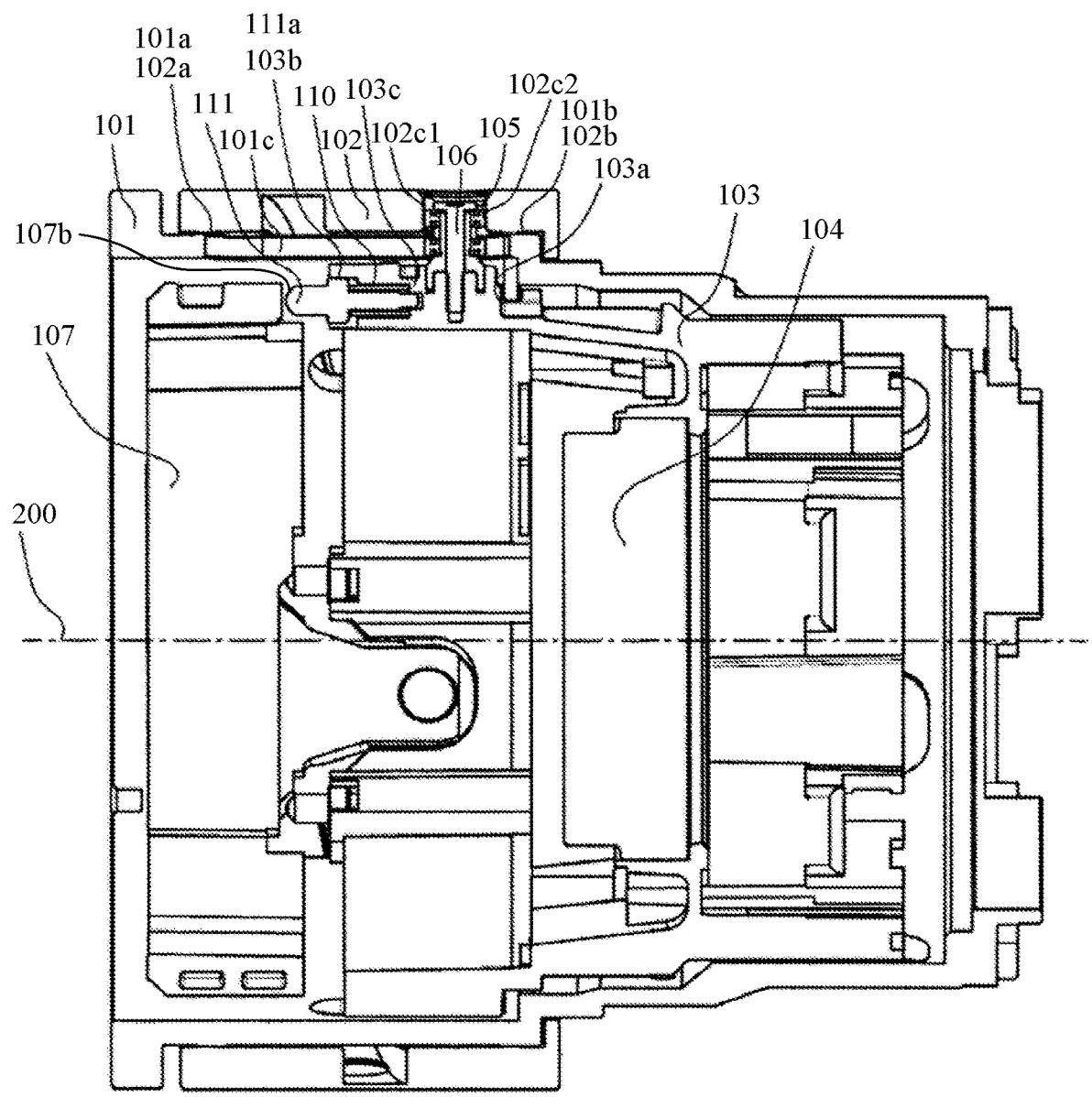
FIG. 2 is a sectional view of the lens barrel according to the first embodiment.
Figure 3:
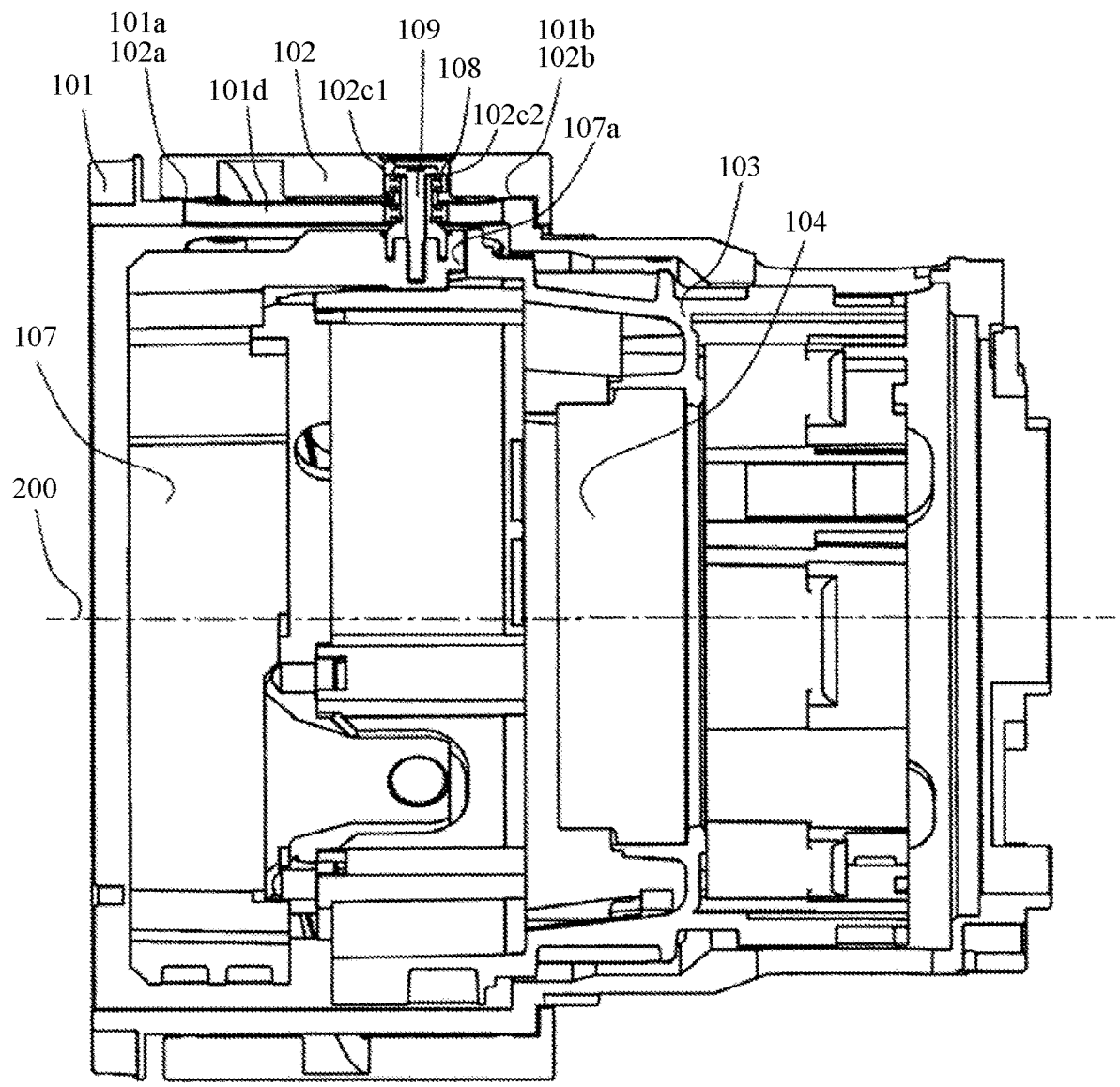
FIG. 3 is a sectional view of the lens barrel according to the first embodiment.

FIG. 1 is an exploded perspective view of a lens barrel (lens apparatus) 100 according to this embodiment. FIGS. 2 and 3 are sectional views of the lens barrel 100, respectively. The lens barrel 100 includes a guiding barrel 101, a cam barrel 102, a lens holding frame (first movable member) 103, and a movable frame (second movable member) 107.

Engagement portions 101a and 101b of the guiding barrel 101 respectively are radially engaged with engagement portions 102a and 102b of the cam barrel 102. The cam barrel 102 is configured to rotate relative to the guiding barrel 101. The guiding barrel 101 has three first rectilinear grooves 101c and three second rectilinear grooves 101d. The cam barrel 102 has three cam grooves 102c.

The lens holding frame 103 holds a lens 104. The lens holding frame 103 has three cam follower holding portions 103a for holding cam followers (first cam followers) 105. The cam follower 105 is fixed onto the lens holding frame 103 with a screw 106. The movable frame 107 is spaced from the lens holding frame 103 by a predetermined distance in the optical axis direction. The movable frame 107 has three cam follower holding portions 107a for holding a cam follower (second cam follower) 108. The cam follower 108 is fixed onto the movable frame 107 with a screw 109.

A biasing member 110 biases a pin (contacting member) 111 extending along an optical axis 200. This embodiment uses a compression coil spring for the biasing member 110. The biasing member 110 and the pin 111 are housed in a housing 103b of the lens holding frame 103 in assembly. An outer diameter portion 111a of the pin 111 is engaged with part of the housing 103b when housed. A first end of the biasing member 110 contacts a spring seating surface 103c of the lens holding frame 103 which is orthogonal to the optical axis 200. A second end of the biasing member 110 contacts the pin 111. The pin 111 is movable back and forth along the optical axis 200 by the biasing force of the biasing member 110 and the guidance of the housing 103b. In other words, the housing 103b serves as a guiding portion for guiding the pin 111 movably back and forth along the optical axis 200.

The pin 111 is biased by the biasing member 110, and a tip portion (first contacting portion) 111b of the pin 111 contacts a contacting portion (second contacting portion) 107b of the movable frame 107. Thus, the lens holding frame 103 and the movable frame 107 are separated from each other by the biasing force of the biasing member 110 via the pin 111. At this time, the cam follower 105 is biased against the first rectilinear groove 101c and the cam groove 102c. The cam follower 108 is biased against the second rectilinear groove 101d and the cam groove 102c. This configuration suppresses rattling between the cam and rectilinear grooves and the cam follower, as the orientation changes or when the lens holding frame 103 moves back and forth along the optical axis 200 as the cam barrel 102 rotates. This embodiment disposes a plurality of pins 111 along the circumferential direction of the lens barrel 100. At least one of the cam follower 105 and the cam follower 108 is disposed between the plurality of pins 111. This configuration can make compact the lens barrel 100.

Figure 4:
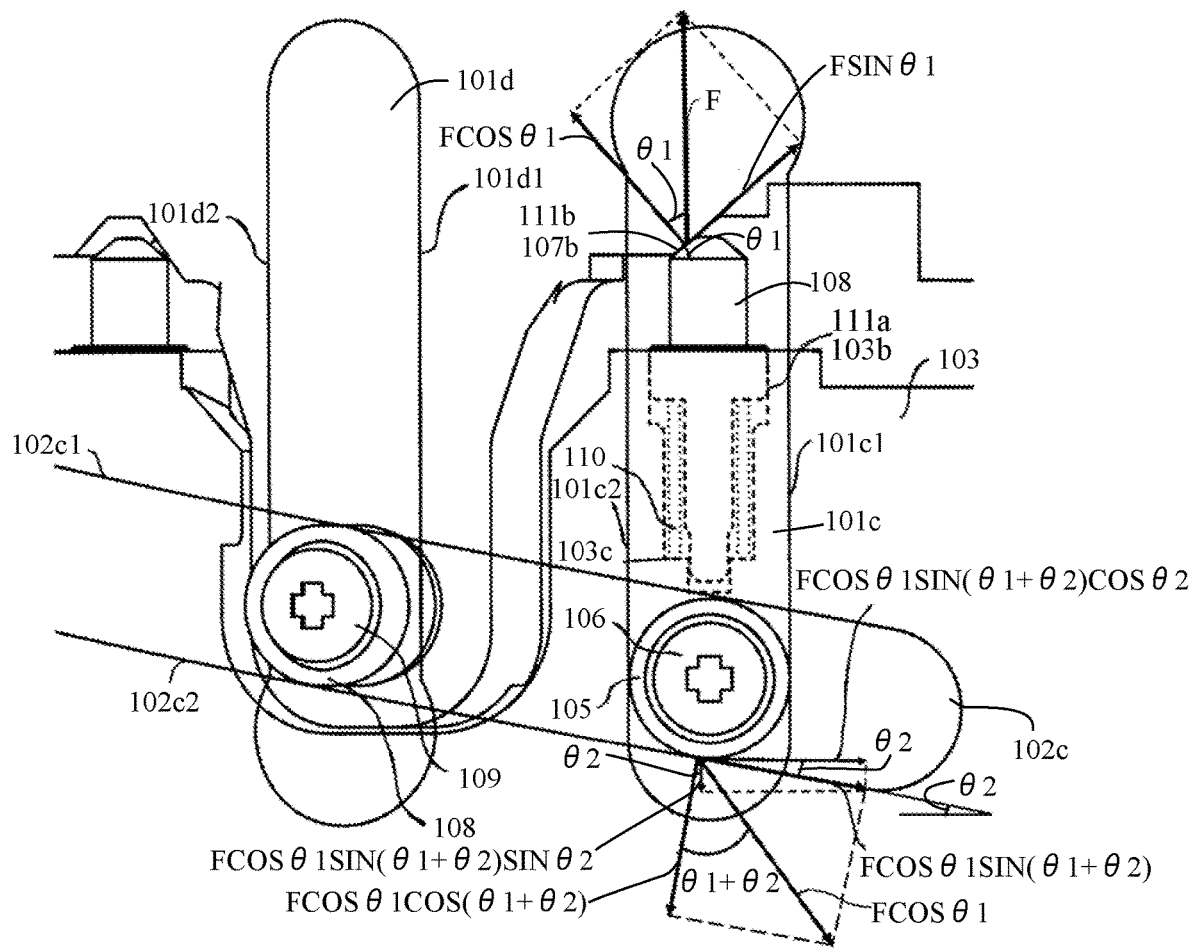
FIG. 4 is a schematic view of the lens barrel according to the first embodiment.
Figure 5:
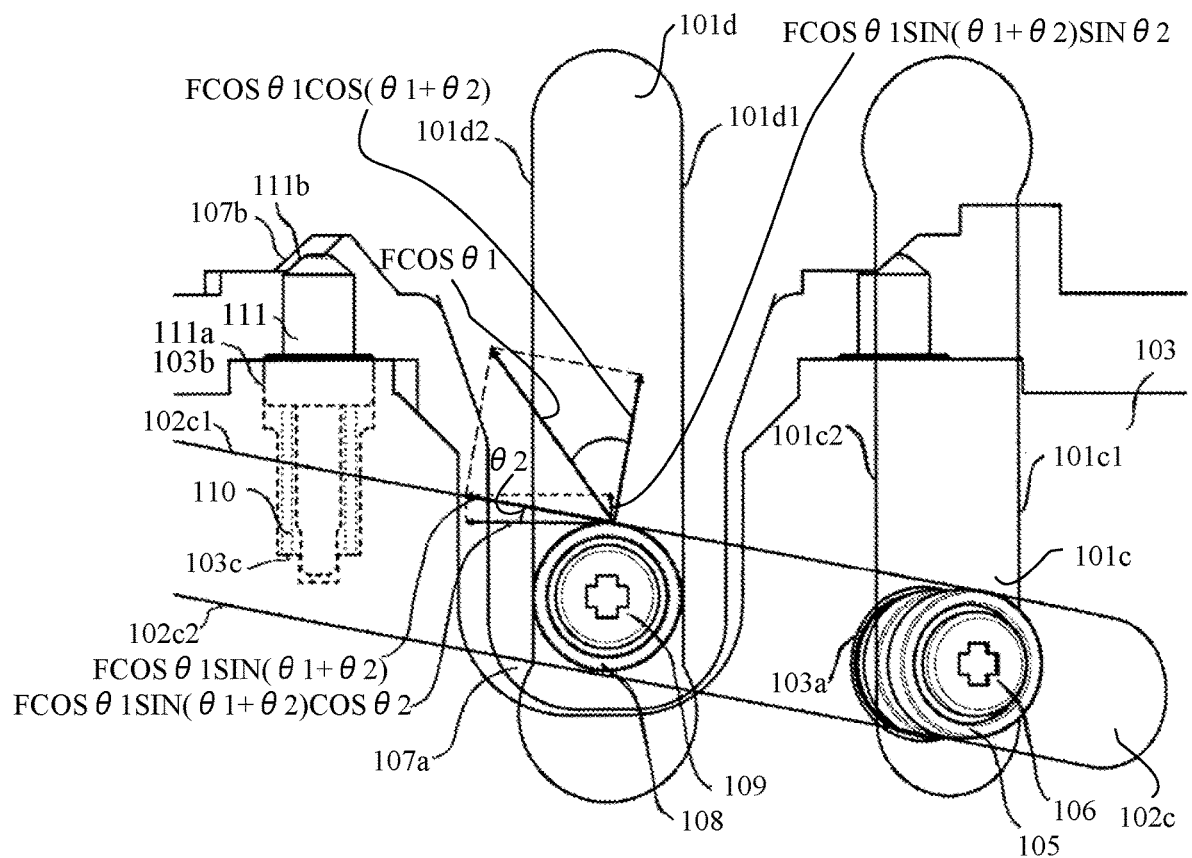
FIG. 5 is a schematic view of the lens barrel according to the first embodiment.

Referring now to FIGS. 4 and 5, a description will be given of the biasing force of the cam follower 105 against the first rectilinear groove 101c and the cam groove 102c and the biasing force of the cam follower 108 against the second rectilinear groove 101d and the cam groove 102c.

FIGS. 4 and 5 are schematic views of the lens barrel 100. As described above, the tip portion 111b of the pin 111 is biased by the biasing member 110 and contacts the contacting portion 107b of the movable frame 107. Herein, the tip portion 111b inclines to the optical axis 200. The contacting portion 107b also inclines to the optical axis 200. This embodiment makes equal to each other the inclination angle of the tip portion 111b to the optical axis 200 and the inclination angle of the contacting portion 107b to the optical axis 200. The term "equal" does not only mean strictly equal but permits substantial equal so as to cover a sufficiently small difference. In this embodiment, the tip portion 111b and the contacting portion 107b incline to the optical axis 200. However, at least one of the tip portion 111b and the contacting portion 107b may incline to the optical axis 200 since the direction in which the tip portion 111b biases the contacting portion 107b may incline to the optical axis.

Assume that θ1 is the inclination angle of the tip portion 111b and the contacting portion 107b to the optical axis 200, F is the biasing force of the biasing member 110, and θ2 is the cam elevation angle of the cam groove 102c. Then, as illustrated in FIG. 4, a biasing force F cos θ1 is applied to the contacting portion 107b, and a reaction force F cos θ1 is applied to the tip portion 111b. Thereby, the cam follower 105 is biased against a side surface 102c2 of the cam groove 102c. A biasing force F cos θ1 cos(θ1+θ2) is applied in a direction orthogonal to the cam groove 102c, and a biasing force F cos θ1 sin(θ1+θ2) is applied in a direction parallel to the cam groove 102c. A biasing force F cos θ1 sin(θ1+θ2)cos θ2 is applied in the direction orthogonal to the first rectilinear grooves 101c, and the cam follower 105 is biased against a side surface 101c1 of the first rectilinear grooves 101c.

In the conventional configuration, the angle when the biasing force F of the biasing member 110 is decomposed in the directions orthogonal to and parallel to the cam groove 102c depends only on the cam elevation angle θ2. A biasing force F cos θ2 is applied in the direction orthogonal to the cam groove 102c, and a biasing force F sin θ2 is applied in the direction parallel to the cam groove 102c. A biasing force F sin θ2 cos θ2 is applied in the direction orthogonal to the first rectilinear grooves 101c. As the cam elevation angle θ2 reduces, the biasing force F sin θ2 cos θ2 in the direction orthogonal to the first rectilinear grooves 101c reduces, and consequently the rattling cannot be completely removed between the first rectilinear grooves 101c and the cam follower 105 as the orientation changes. As the biasing force F of the biasing member 110 increases, the biasing force F cos θ in the direction orthogonal to the cam groove 102c becomes larger than necessary. In that case, as the number of operation times of the lens barrel 100 increases, the cam follower 105 or the cam groove 102c is likely to abrade, and the quality is lost such as quietness and operation feeling.

This embodiment brings the tip portion 111b and the contacting portion 107b into contact with each other so as to apply to the contacting portion 107b, the biasing force F cos θ1 in the direction in which the tip portion 111b inclines by the inclination angle θ1 to the optical axis 200 by the biasing force F of the biasing member 110. The angle when the biasing force F cos θ1 is decomposed in the directions orthogonal to and parallel to the cam groove 102c depends on the cam elevation angle θ2 and the inclination angle θ1. As a consequence, the biasing force distribution between the cam groove 102c and the first rectilinear groove 101c can be optimized by adjusting the inclination angle θ1. This embodiment can thus eliminate the rattling between the first rectilinear groove 101c and the cam follower 105 as the orientation changes, suppress the degraded optical performance, and improve the quality such as quietness and operation feeling.

When the biasing force F cos θ1 is applied to the contacting portion 107c, as illustrated in FIG. 5, the cam follower 108 is biased against the side surface 102c1 of the cam groove 102c. A component force F cos θ1 cos(θ1+θ2) is applied in a direction orthogonal to the cam groove 102c, and a component force F cos θ1 sin(θ1+θ2) is applied in a direction parallel to the cam groove 102c. The component force F cos θ1 sin(θ1+θ2)cos θ2 is added in the direction orthogonal to the second rectilinear grooves 101d, and the cam follower 108 is biased against a side surface 101d2 of the second rectilinear grooves 101d.

In the conventional configuration, the angle when the biasing force F of the biasing member 110 is decomposed in the directions orthogonal to and parallel to the cam groove 102c depends only on the cam elevation angle θ2. The biasing force F cos θ2 is applied in the direction orthogonal to the cam groove 102c, and the biasing force F sin θ2 is applied in the direction parallel to the cam groove 102c. The biasing force F sin θ2 cos θ2 is applied in the direction orthogonal to the second rectilinear grooves 101d. As the cam elevation angle θ2 reduces, the biasing force F sin θ2 cos θ2 in the direction orthogonal to the second rectilinear grooves 101d reduces, and consequently the rattling cannot be completely removed between the second rectilinear grooves 101d and the cam follower 108 as the orientation changes. When the biasing force F of the biasing member 110 increases, the biasing force F cos θ in the direction orthogonal to the cam groove 102c becomes larger than necessary. In that case, as the number of operation times of the lens barrel 100 increases, the cam follower 108 or the cam groove 102c is likely to abrade, and the quality is lost such as quietness and operation feeling.

This embodiment brings the tip portion 111b and the contacting portion 107b into contact with each other so as to apply to the contacting portion 107b, the biasing force F cos θ1 in the direction in which the tip portion 111b inclines by the inclination angle θ1 to the optical axis 200 by the biasing force F of the biasing member 110. The angle when the biasing force F cos θ1 is decomposed in the directions orthogonal to and parallel to the cam groove 102c depends on the cam elevation angle θ2 and the inclination angle θ1. The biasing force distribution between the cam groove 102d and the second rectilinear groove 101d can be optimized by adjusting the inclination angle θ1. This embodiment can thus eliminate the rattling between the second rectilinear grooves 101d and the cam follower 108 as the orientation changes, suppress the degraded optical performance, and improve the quality such as quietness and operation feeling.

This embodiment adjusts the inclination angle θ1 to 45° so that each cam follower applies an equal force to the cam grooves and the rectilinear grooves, but the present invention is not limited to this embodiment. The inclination angle θ1 can be arbitrarily set, but may be adjusted from 30° to 60°.

While this embodiment uses the configuration for biasing the contacting portion 107b by the biasing member 110 via the pin 111, another conceivable configuration is to directly bias the contacting portion 107b by using a leaf spring for the biasing member 110. However, this configuration may change not only the magnitude of the biasing force F but also the direction due to the influence of the component manufacturing scattering. Thus, it becomes difficult to optimize the biasing force distribution between the cam groove 102d and the first rectilinear groove 101c. This embodiment can suppress the directional fluctuation of the biasing force F of the biasing member 110 because the biasing force of the biasing member 110 brings the tip portion 111b and the contacting portion 107b into contact with each other. Therefore, the biasing force distribution can be optimized to suppress the degraded optical performance as the orientation changes and to improve the quality such as quietness and operation feeling.

This embodiment holds the pin 111 through the lens holding frame 103, but may hold it through the movable frame 107. Then, the contacting portions provided to the tip portion 111b and the lens holding frame 103 may contact each other so as to apply to the contacting portion provided on the lens holding frame 103, the biasing force F cos θ1 in the direction in which the tip portion 111b inclines to the optical axis 200 by the inclination angle θ1.

Second Embodiment

Figure 6:
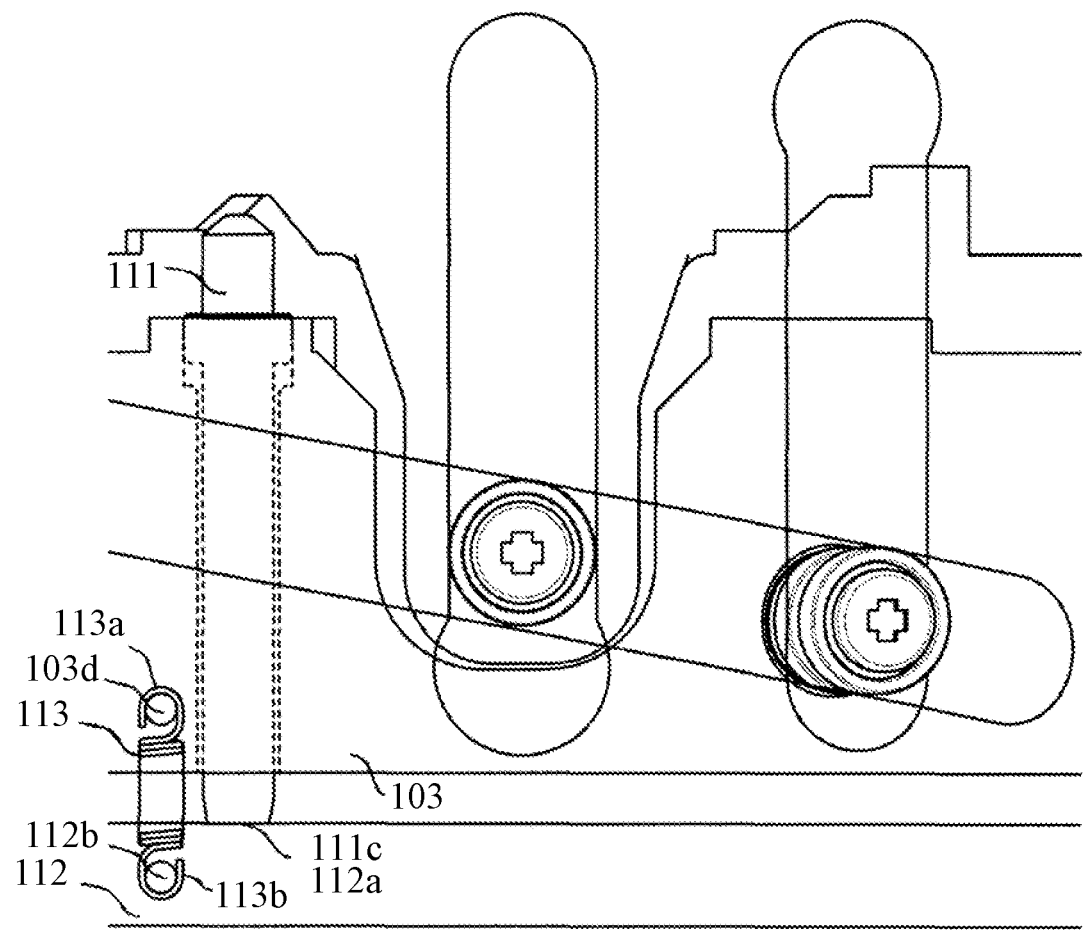
FIG. 6 is a schematic view of the lens barrel according to a second embodiment.

FIG. 6 is a schematic view of the lens barrel 100 according to this embodiment. This embodiment describes only the configuration different from the lens barrel 100 according to the first embodiment.

This embodiment uses a tension coil spring 113 for a biasing member. An end surface 111c of the pin 111 contacts an end surface 112a of a movable frame (third movable member) 112. Arm portions 113a and 113b of the tension coil spring 113 are hooked on an arm portion 103d of the lens holding frame 103 and an arm portion 112b of the movable frame 112, respectively. The movable frame 112 is attracted to the lens holding frame 103 by the biasing force of the tension coil spring 113. Thereby, the pin 111 is movable back and forth along the optical axis 200.

Third Embodiment

Figure 7:
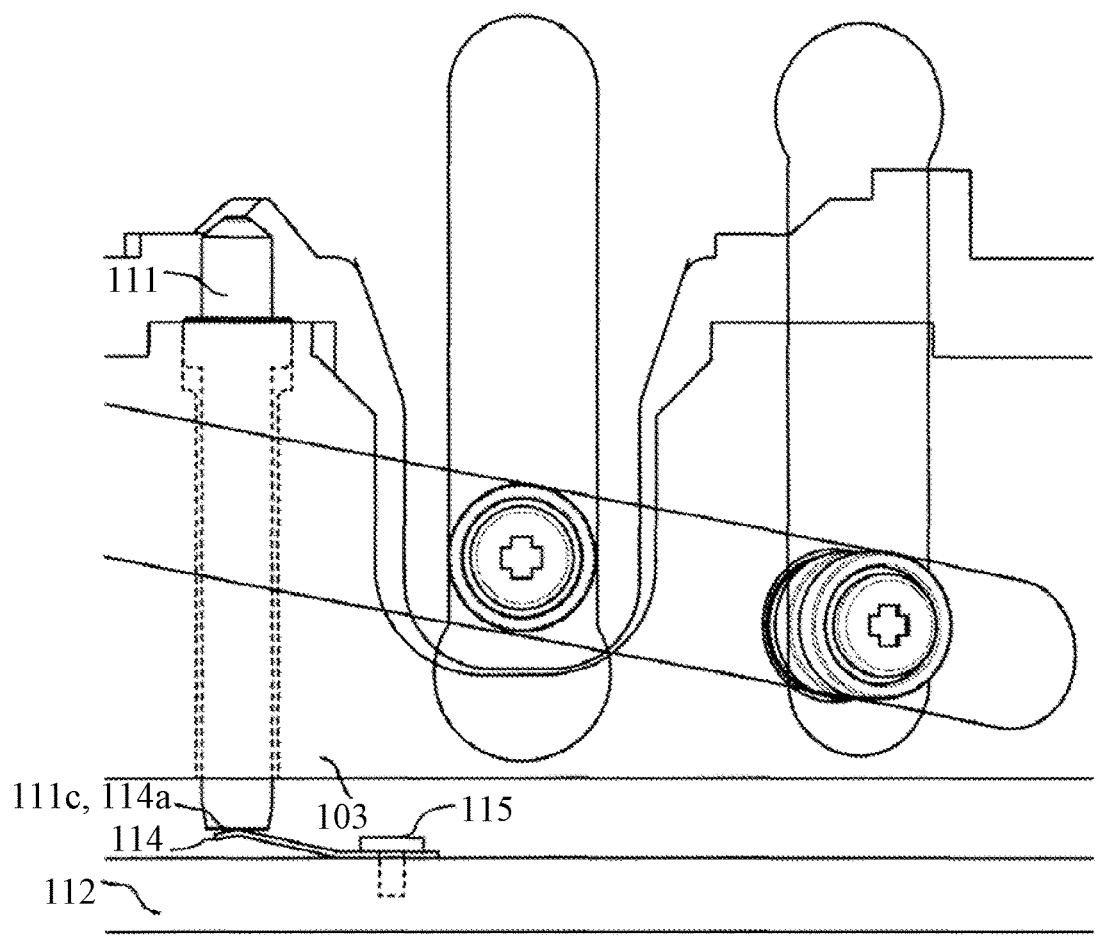
FIG. 7 is a schematic view of a lens barrel according to a third embodiment.

FIG. 7 is a schematic view of the lens barrel 100 according to this embodiment. This embodiment describes only a configurations different from the lens barrel 100 according to the first and second embodiments.

This embodiment uses a leaf spring 114 for a biasing member. The leaf spring 114 has a first end fixed to the movable frame 112 with a screw 115. An arm portion 114a of the leaf spring 114 contacts the end surface 111c and biases the pin 111. Thereby, the pin 111 is movable back and forth along the optical axis 200.

Fourth Embodiment

Figure 8:
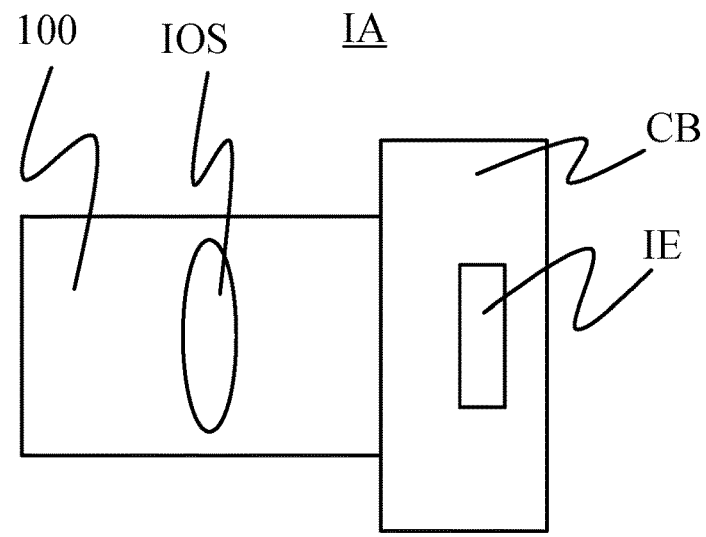
FIG. 8 is a schematic view of an imaging apparatus having the lens barrel according to any one of the first to third embodiments.

FIG. 8 is a schematic view of an imaging apparatus IA including the lens barrel 100 according to any one of the first to third embodiments. The lens barrel 100 holds an imaging optical system IOS. A camera body CB holds an image sensor IE. The image sensor IE photoelectrically converts an optical image formed through the lens barrel 100. The lens barrel 100 may be integrated with the camera body CB, or may be detachably attached to the camera body CB. The lens barrel 100 may hold the image sensor IE.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-118475, filed on Jun. 22, 2018, which is hereby incorporated by reference herein in its entirety.

What is claimed is:
1. A lens apparatus comprising:
   a cam barrel including a cam groove;
   a guiding barrel including a first rectilinear groove and a second rectilinear groove;
   a first movable member including a first cam follower engaged with the cam groove and the first rectilinear groove, and configured to move forward and backward in an optical axis direction of the lens apparatus with rotation of the cam barrel;

a second movable member including a second cam follower engaged with the cam groove and the second rectilinear groove, and configured to move forward and backward in the optical axis direction with rotation of the cam barrel;

a contacting member provided on the first movable member; and a biasing member configured to bias the contacting member, wherein the contacting member includes a first contacting portion that contacts the second movable member, the second movable member includes a second contacting portion that contacts the first contacting portion, and at least one of the first contacting portion and the second contacting portion inclines to the optical axis direction.

2. The lens apparatus according to claim 1, wherein one of the first movable member and the second movable member holds a lens.

3. The lens apparatus according to claim 1, wherein the first movable member includes a guiding portion configured to guide the contacting member movably back and forth in the optical axis direction.

4. The lens apparatus according to claim 1, wherein the biasing member biases the contacting member so as to bring the first contacting portion into contact with the second contacting portion, and thereby biases the first cam follower against the cam groove and the first rectilinear groove, and the second cam follower against the cam groove and the second rectilinear groove.

5. The lens apparatus according to claim 1, wherein at least one of the first contacting portion and the second contacting portion inclines to the optical axis direction so that the first cam follower applies an equal force to the cam groove and the first rectilinear groove and the second cam follower applies an equal force to the cam groove and the second rectilinear groove.

6. The lens apparatus according to claim 1, wherein the plurality of contacting members are arranged along a circumferential direction of the first movable member, and wherein at least one of the first cam follower and the second cam follower is disposed between the plurality of contacting members.

7. The lens apparatus according to claim 1, wherein the biasing member is a compression coil spring.

8. The lens apparatus according to claim 1, further comprising a third movable member configured to hold the biasing member, wherein the biasing member is a tension coil spring.

9. The lens apparatus according to claim 1, further comprising a third movable member configured to hold the biasing member, wherein the biasing member is a leaf spring.

10. An imaging apparatus comprising:

a lens apparatus; and a camera body configured to hold an image sensor configured to photoelectrically convert an optical image formed through the lens apparatus;

wherein said lens apparatus includes:

a cam barrel including a cam groove;

a guiding barrel including a first rectilinear groove and a second rectilinear groove;

a first movable member including a first cam follower engaged with the cam groove and the first rectilinear groove, and configured to move forward and backward in an optical axis direction of the lens apparatus with rotation of the cam barrel;

a second movable member including a second cam follower engaged with the cam groove and the second rectilinear groove, and configured to move forward and backward in the optical axis direction with rotation of the cam barrel;

a contacting member provided on the first movable member; and a biasing member configured to bias the contacting member, wherein the contacting member includes a first contacting portion that contacts the second movable member, the second movable member includes a second contacting portion that contacts the first contacting portion, and at least one of the first contacting portion and the second contacting portion inclines to the optical axis direction.

* * * * *